INVENTOR.
ERIC A. SALO
BY Naylor & Neal
ATTORNEYS

Feb. 2, 1971   E. A. SALO   3,560,115
THREE ELEMENT COMBINED ENERGY CYCLE

Filed Nov. 4, 1968   5 Sheets-Sheet 3

INVENTOR.
ERIC A. SALO
BY Naylor & Neal
ATTORNEY

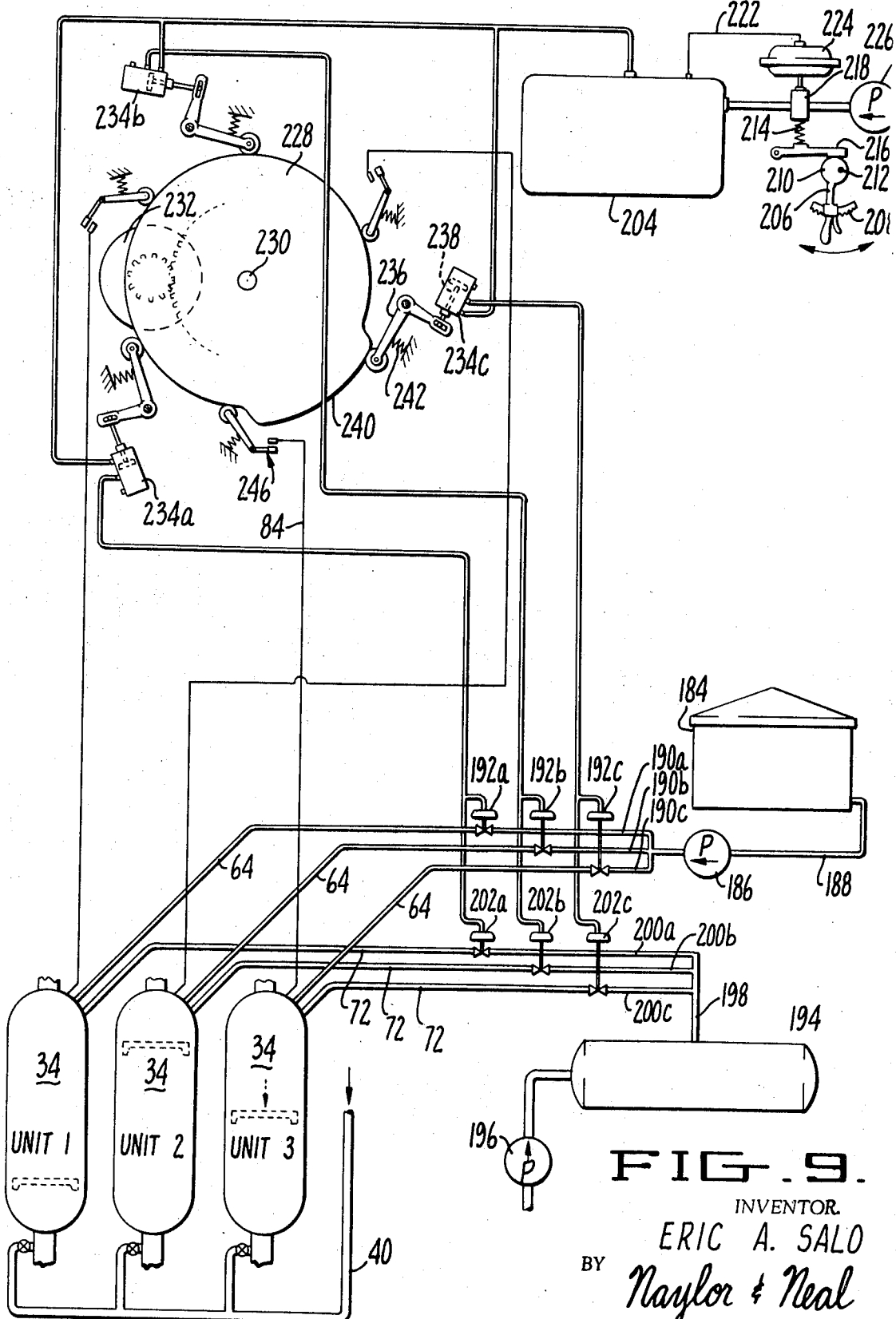

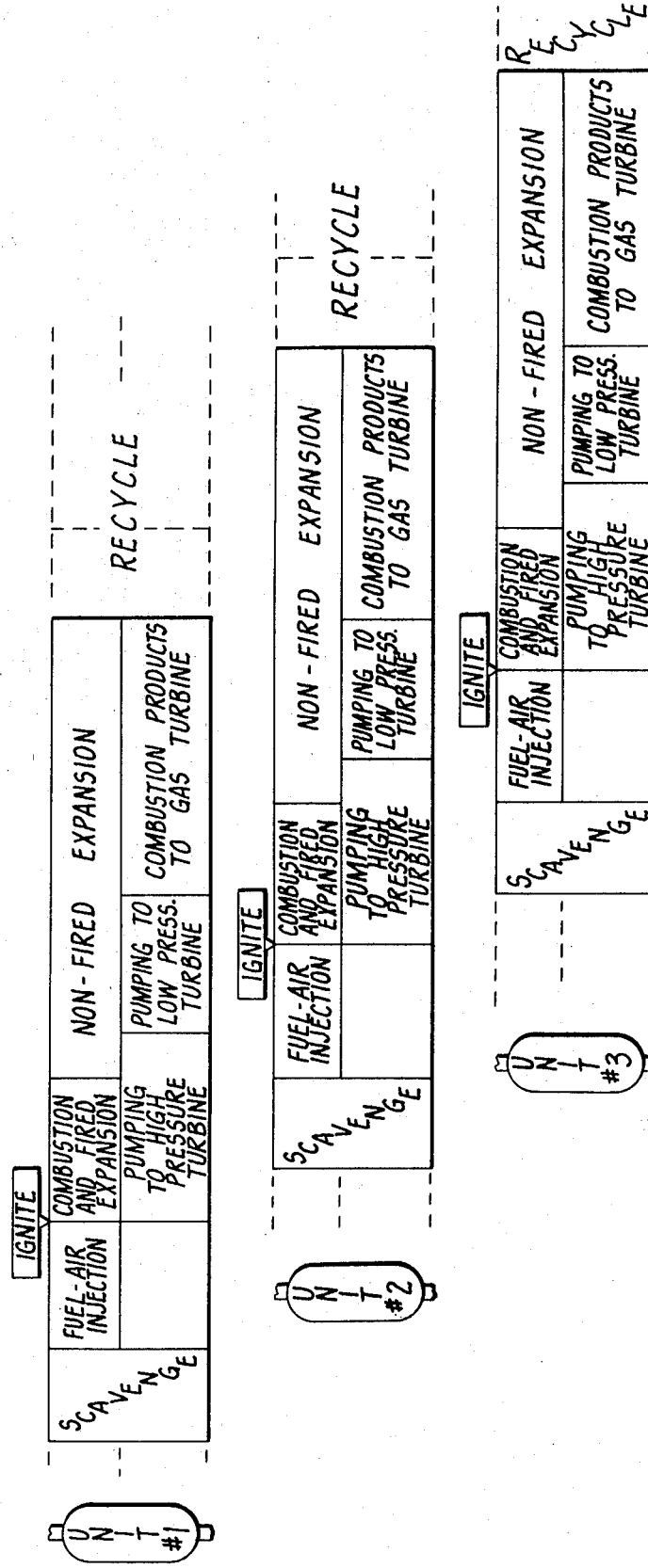

3,560,115
Patented Feb. 2, 1971

3,560,115
THREE ELEMENT COMBINED ENERGY CYCLE
Eric A. Salo, 15898 Via Pinale,
San Lorenzo, Calif. 94580
Filed Nov. 4, 1968, Ser. No. 773,000
Int. Cl. F04b *17/00*
U.S. Cl. 417—339                                6 Claims

ABSTRACT OF THE DISCLOSURE

A combustion pump, primarily for powering an electric generator, having: a high pressure cylindrical casing containing a piston freely slidable within the casing; an hydraulic chamber, defined by the bottom of the free piston, the cylindrical casing and a hemispherical lower portion of the casing, into which water is admitted to raise the free piston to a top position; a combustion chamber defined by the top of the free piston, the cylindrical casing and a hemispherical cylinder head wherein a compressed mixture of fuel and air is admitted and ignited, whereby the piston is forced to descend, pumping the water in the hydraulic chamber at high pressure to a first hydraulic impulse turbine, and thereafter, upon reaching, a lower first terminal pressure, pumping the water to a second hydraulic impulse turbine until a selected second terminal pressure is reached, whereupon the products of combustion are discharged to a gas turbine.

BACKGROUND OF THE INVENTION

As requirements for electrical power increase, new and different means of powering electric generators are required to satisfy the variety of conditions under which a plant must operate to produce cheap electrical power. The combustion pump of the invention, when utilized in combination with a three stage turbine system provides a competitive means of producing electrical power. Although the combustion pump may be employed for other uses, its primary use is for the production of electrical power.

Power plants of conventional design often have certain limitations which curtail their efficiency under certain operating conditions. Nuclear and other thermal plants have large water requirements for cooling which necessitate location of the plants near large water supplies. Conventional hydraulic plants also depend on a continuous supply of water, and are further limited by the necessity of locating plants where natural water heads occur. Additional problems of atmospheric or thermal pollution affect a determination of the plant design for a particular location.

SUMMARY OF THE INVENTION

The apparatus of the invention in its basic form can most aptly be described as a combustion pump. Fuel is principally converted to hydraulic energy in the form of pumped fluid at extremely high pressures. To raise the overall efficiency of the energy cycle the combustion products are further utilized to drive a conventional gas turbine. In its basic form the invention is relatively simple. A reciprocating piston engine, comprising a cylinder, a free piston and a cylinder head, which together form a combustion chamber, converts chemical energy into hydraulic energy rather than into the conventional mechanical energy customarily associated with a reciprocating piston engine. The hydraulic energy may then be utilized to power a high speed hydraulic turbine. In conventional reciprocating piston engines, great energy losses occur between the combustion process and the ultimate mechanical power output. Principal among the losses are: friction, between the many required moving parts; thermal, from the cooling water and exhausted waste gases; static and dynamic, in the linkage transmission from linear to rotational output. Although not totally removed, these losses are substantially reduced in the apparatus of the invention by first converting the linear piston movement to hydraulic energy.

The combustion pump, herein disclosed, has been adapted to power an electric generator for which it is primarily suitable. A high pressure cylindrical casing contains a piston which is freely slidable in an inner cylindrical sleeve of the casing. A combustion chamber is defined by the top of the free piston, the casing sleeve and a hemispherical cylinder head. A mixture of fuel and air may be compressed in the combustion chamber by a variety of conventional methods. However, to attain the extremely high pressures desired in the pump unit, a method similar to that employed in certain deisel engines is preferred. With the piston at a top position, fuel and air are simultaneously injected at high pressure into the combustion chamber.

Below the free piston a hydraulic chamber is defined by the bottom of the free piston, the casing sleeve and a hemispherical lower portion of the casing. The free piston, which is mechanically contained in the cylindrical casing only by action of the sides of the piston against the casing sleeve, is raised to the top position by admission of water from a conventional water supply. Once the piston reaches the top dead position by the hydraulic lift from admitted water, the supplied water is valved off.

With fuel and air injected, the unit commences its power stroke when the gas mixture is ignited. The high pressure developed by the combusted gases is transmitted through the piston by the downward force exerted on the top of the piston to the water in the hydraulic chamber. The high pressure water is bled through discharge lines to a discharge nozzle which emits an extremely high velocity water jet to an impulse-type hydraulic turbine. Although a single hydraulic turbine may comprise the sole power output of the combustion pump, the efficiency of the energy cycle may be raised considerably by employing a three stage output.

As the water is discharged, the free piston descends in the cylindrical casing. The descending piston permits the combustion gases to expand in the enlarged combustion chamber thereby causing an accompanying loss in pressure which is transmitted to the water in the hydraulic chamber. Since hydraulic turbine design varies according to the velocity and flow of the drive fluid to obtain an efficient power output, it enhances the overall efficiency of the combustion pump to employ two separate hydraulic turbines to effectively handle the wide pressure range encountered during operation of the pump. A first turbine is supplied by water at the initial high pressure immediately subsequent to combustion. As the pressure transmitted to the water drops to a selected terminal pressure below which the first turbine would not be driven efficiently, the supply to the first turbine closes upon automatic closing of a regulator valve and the supply to the second turbine commences. This first terminal pressure may, for example, be 1000 p.s.i.

Water is supplied to the second hydraulic turbine through a discharge nozzle such as is utilized for the first turbine until the velocity-flow relationship of the emitted jet no longer efficiently drives the turbine. A second regulator valve terminates the water supply at a related second terminal pressure of the water in the hydraulic chamber which in the disclosed embodiment is selected at 200 p.s.i. At the second terminal pressure, the water contained in the hydraulic chamber has been substantially discharged to either the first or second hydraulic turbines.

To additionally increase the overall operating efficiency of the combustion pump, the combustion products are exhausted to a gas turbine comprising a third stage output for the cycle. The combustion products continue to drive the gas turbine until expansion of the combustion products nears completion. At an appropriate pressure slightly above atmospheric pressure, water is again admitted to the hydraulic chamber raising the free piston to the top dead position and scavenging any remaining combustion products in the combustion chamber. An exhaust valve automatically closes upon positioning the piston at the top of its stroke and the combustion pump is again ready to commence another cycle.

The two hydraulic turbines and the gas turbine may be appropriately coupled together to drive an electric generator. Although a geared coupling will in all likelihood be necessary to accommodate the differing speeds of the turbines corresponding to their most efficient operation, the turbines are schematically disclosed in the drawings as directly coupled for simplicity of description.

To provide a relatively continuous output to each of the three output stages, a plurality of individual units are integrated and controlled by a central cam-operated timing device. For instance, sequential coordination of three units would operate to supply the discharge nozzle for a single first hydraulic turbine with high pressure water from the second unit once the high pressure supply from the first unit ceased. Sequentially, high pressure water from the third unit would be supplied once pumped water from the second unit ceased. Similarly, for the second hydraulic turbine and gas turbine the respective fluids could be supplied in a substantially continuous manner to thereby further increase the efficiency of a power plant.

A power plant utilizing the subject combustion pumps contains many advantages over a plant utilizing either conventional reciprocal combustion engines or conventional steam generators for driving steam turbines. The combustion pump contains far fewer moving parts than a conventional reciprocal combustion engine, and the combustion pump may be continuously operated with far fewer incident breakdowns than are encountered in continuous operation of conventional reciprocal combustion engines. An additional contributing factor to prolonging continuous operation is the low cycle frequency which also enables use of cheaper fuels than those necessary for high speed reciprocal combustion engines. The free-piston design permits construction of large units not attainable by the conventional reciprocal engines.

These large units are cost-competitive with the larger steam-electric power equipment and yet have certain distinct advantages over such equipment. Since steam is not utilized to a signficant extent to any of the three output stages in the subject combustion pump, starting and stopping times are of very short duration. In conventional steam power equipment, a substantial amount of energy is lost in the change of state involved when turbine steam is condensed, the loss corresponding to the latent heat of steam. Such energy losses greatly limit the overall effiiciency of steam power equipment.

The combustion pump when employed in an electric power plant has additional advantages over conventional steam power equipment with which the invented device is particularly competitive. The comparative low retention time of the combustion products in the combustion pump inhibits the agglomeration of fuel minerals into particulates of the light-scattering size range and minimizes the formation of visible emissions, thereby resulting in less objectionable emissions of products of combustion than in conventional plants. Also, thermal pollution, common in conventional thermal or nuclear plants, is substantially reduced as the water cooling requirements are only a fraction of the requirements for conventional plants. This advantage also permits location of the power plant utilizing combustion pumps to be convenient to the load rather than to cooling water. It alternately enables the subject power plant to be readily and cheaply integrated into existing hydraulic generating stations to provide full generator output during periods of curtailed water supply.

Since high temperature metallurgy problems are confined to the gas turbine which contributes only a relatively small portion of the total output of the combustion pump, manufacturing and maintenance costs are drastically reduced. Use of hydraulic power as the prime mover to operate the electric generator greatly reduces starting warm-up and permits practically instantaneous adjustment to load changes over the full output range of the combustion pump. These and other advantages will become apparent from a detailed consideration of the drawings and accompanying specification.

BRIEF DESCRIPTION OF THE DRAWINGS

FIG. 9 is a schematic illustration of the three unit pump and timing control system.

FIG. 10 is a sequence chart illustrating the sequence of operations for the three unit pump shown in FIG. 1.

DETAILED DESCRIPTION OF THE INVENTION

Figure 1:
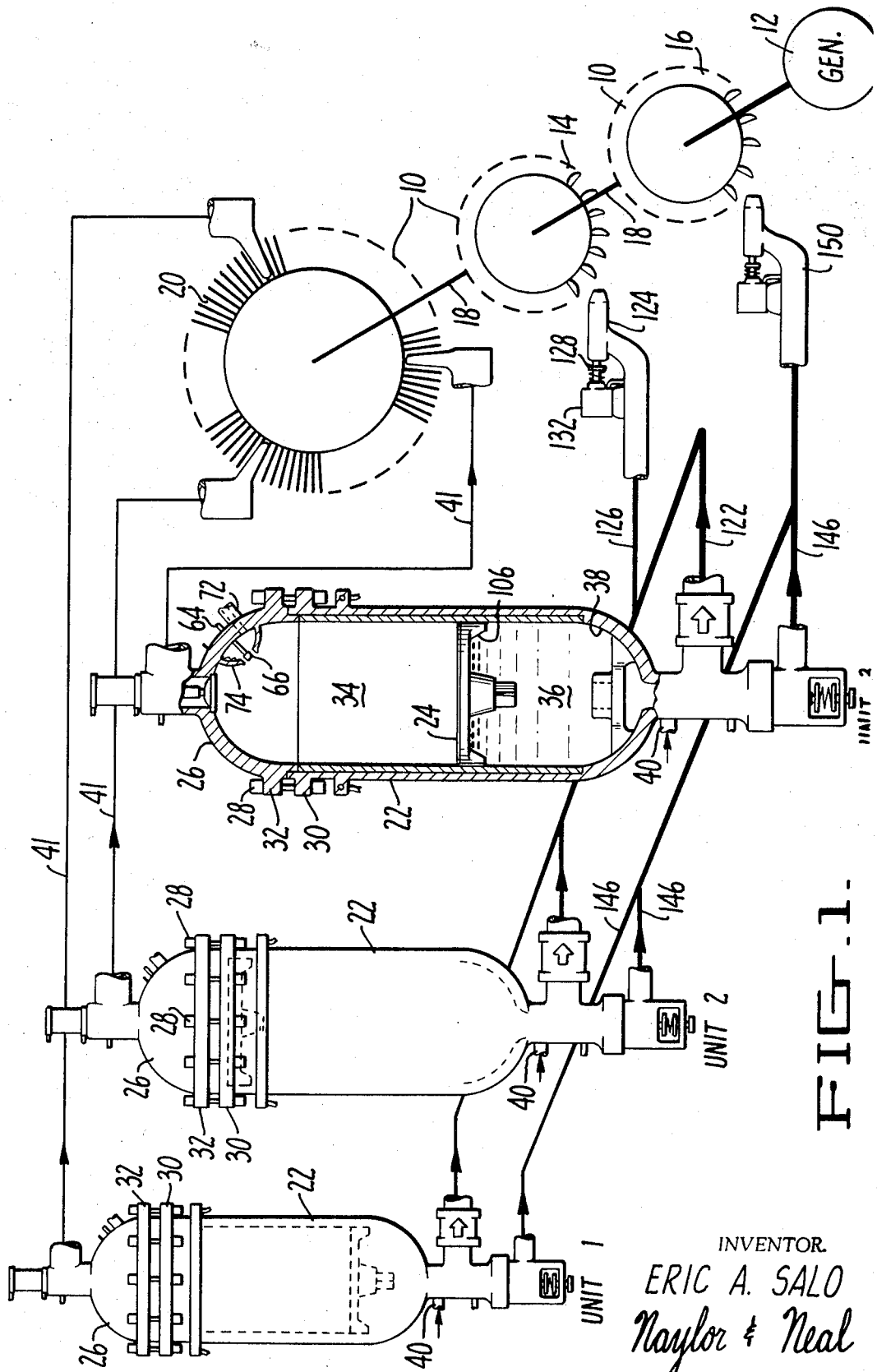
FIG. 1 is a schematic illustration of a three unit combustion-pump powering an electric generator.

FIG. 1 illustrates a detailed schematic of the basic elements in a three unit combustion pump principally for use in a power plant. The combined chamber units, unit 1, unit 2 and unit 3, deliver a three-stage output to a combination turbine 10 that is coupled to an electric generator 12. The first stage output of the combined units is a high velocity water discharge delivered to a first hydraulic turbine 14. The second stage output is a lower velocity water discharge delivered to a second hydraulic turbine 16, which may be connected to the first hydraulic turbine 14 by a shaft 18. The two hydraulic turbines 14 and 16 are of the impulse type and each is of conventional design for handling the respective velocity and flow of water discharge for each output stage. The third stage output comprises a gas discharge of the combustion products of the three units. The gas discharge drives a gas turbine 20 coupled to hydraulic turbines 14 and 16 by the common shaft 18. The combined rotational output of the three turbines 14, 16 and 20 powers the electric generator 12.

The three-stage output is developed by a novel combustion engine which operates most efficiently when three identical chamber units are coupled in sequence to provide a continuous output at each of the three output stages. For simplicity of description the elements of each of the three identical units will be designated by the same numerals on each unit.

As illustrated in FIG. 1, each chamber unit has a cylindrical high-pressure casing 22 in which a free-floating piston 24 is encased. The cylindrical casing is capped with a cylinder head 26 fastened to the cylindrical casing 22 by a peripheral series of bolts extending through a flange 30 on the cylindrical casing and a flange 32 on the cylinder head 26. At one side of the free-floating piston is a combustion chamber 34 formed by the cylindrical casing 22, the cylinder head 26, and the free-floating piston 24.

At the opposite side of the free-floating piston 24 is a hydraulic chamber 36 formed by the cylindrical casing 22, a hemispherical end portion 38 of the cylindrical casing, and the free-floating piston 24.

Figure 2:
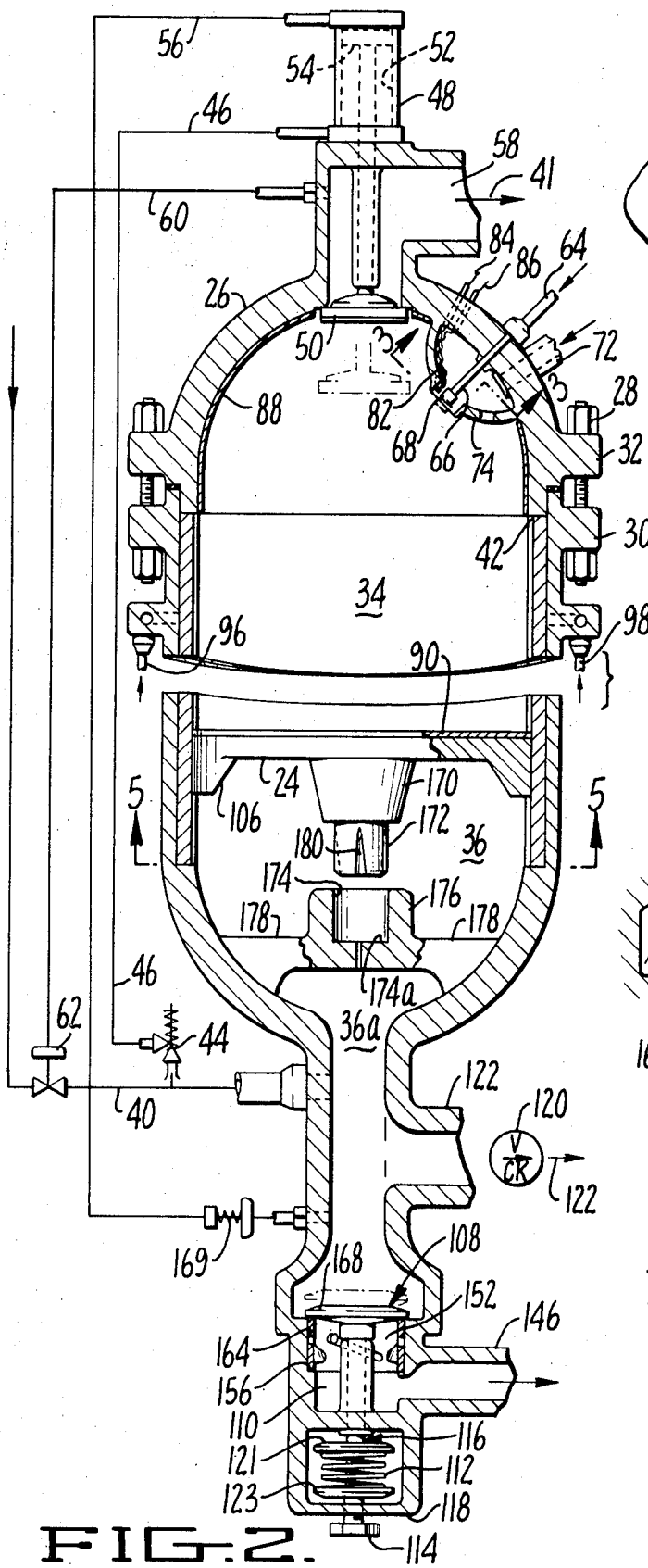
FIG. 2 is a sectional view of a typical pump unit in FIG. 1.

Water is introduced to the hydraulic chamber through a water input line 40 under a moderate pressure common to water supply lines. The moderate pressure of introduced water raises the free-floating piston 24 until the piston reaches an annular stop 42 formed by an overlap of the cylinder head 26 at the juncture of head 26 and casing 22, as shown in FIG. 2. The hydraulic raising of the free-floating piston 24 scavenges residual combustion gases in combustion chamber 34, forcing the residual gases out exhaust discharge line 41.

The water surge produced by the sudden stoppage of the free-floating piston 24 against the annular stop 42 releases a spring-latched relief valve 44 in a hydraulic control line 46 shown in FIG. 2. Water from input line 40 flows through hydraulic control line 46 to a hydraulic actuator 48, FIG. 2, closing exhaust valve 50 in the combustion chamber 34. The hydraulic actuator 48 comprises a conventional arrangement of cylinder 52 and piston 54 hydraulically operated by control lines 46 and 56 connected to the cylinder 52 at each side of the piston 54.

The lowered pressure sensed in exhaust manifold 58 by a pressure sensing line 60 closes a pressure-operated valve 62 in the water input line 40.

Figure 3:
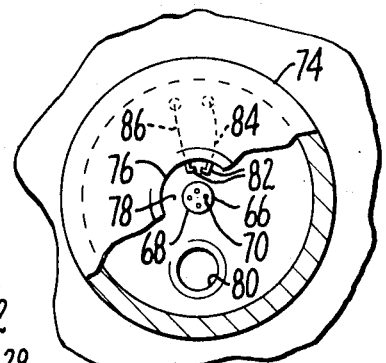
FIG. 3 is an enlarged partial section taken on lines 3—3 in FIG. 2.

With the exhaust valve 50 closed and the free-floating piston 24 at its raised position, the unit, typically unit 2 in FIG. 1, is set for the combustion process. Simultaneously, air and liquid fuel are injected at high pressures into the combustion chamber. Fuel from a high pressure fuel line 64 is injected into the combustion chamber through a fuel-injection nozzle 66 shown most clearly in FIGS. 2 and 3. The tip 68 of the fuel-injection nozzle 66 contains four small holes 70 to disperse the discharged fuel in a fine spray. Air from a high-pressure air supply line 72 is injected into the combustion chamber 34 at a point adjacent fuel injection. To assist in the full and uniform dispersion of the fuel, a cupola 74, FIGS. 2 and 3 is fixed to the cylinder head 26 in the combustion chamber 34. The cupola 74 has an opening 76 which is concentrically located adjacent to the tip 68 of the fuel-injection nozzle 66, creating an annular passage 78 for the air. Compressed air is injected into the cupola 74 at orifice 80, entering the combustion chamber through annular passage 78 and effectively mixing with the injected fuel spray. After the charge of fuel and air is injected, the mixture is ignited by an arcing spark between two electrodes 82 at the end of high voltage leads 84 and 86.

The injection process continues for a timed interval and then ceases when the fuel line 64 and air supply line 72 are valved off by a timing control hereinafter discussed in detail. The ignited gas mixture develops pressures in the combustion chamber greatly exceeding 1000 p.s.i. in the preferred embodiment. To accommodate the high pressures and temperatures in the combustion chamber, the inner wall of the high pressure cylinder head 26 is lined with a deposit of porous metal. This porous metal liner 88, FIG. 2, is able to withstand the high temperatures attained in the combustion chamber. The porous metal liner 88 will additionally prevent excessive thermal stressing through the yielding characteristics of the porous metal. The cylinder head 26 is of hemispherical construction for the high strength advantages inherent in such structural design. The free-floating piston 24 also contains a porous metal liner 90 on the surface exposed to the combustion chamber 34. This liner 90 has the same advantageous characteristics as the liner 88 in the cylinder head 26.

Since the cylindrical casing 22 is exposed to both the high temperatures of the combustion chamber 34 and the low temperatures of the hydraulic chamber 36 during each complete cycle of a unit's operation, a special liner or sleeve is required to dissipate the thermal stressing inherent from the thermal extremes encountered during operation.

Figure 5:
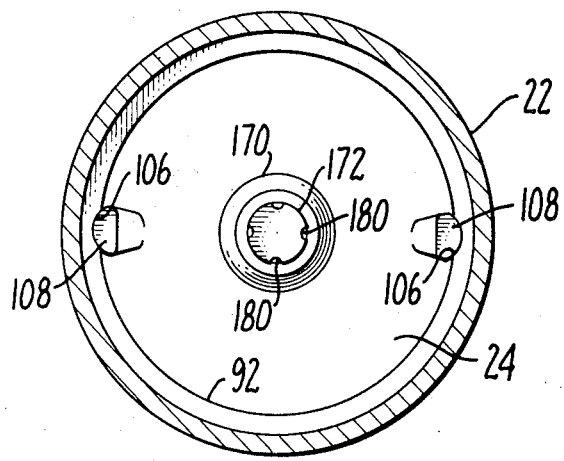
FIG. 5 is a sectional view taken on lines 5—5 in FIG. 2.
Figure 7:
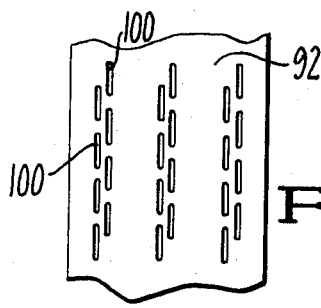
FIG. 7 is a partial section showing the surface of the liner taken along the lines 7—7 in FIG. 6.

FIG. 5 illustrates the metallic liner 92 interposed between the cylindrical casing 22 and the free-floating piston 24. The liner 92 is shown in greater detail in cross-section in FIG. 6. The liner 92 contains a plurality of interconnected cooling water channels 94, to which water is circulated by supply 96 and return line 98, both shown in FIG. 2. The channels 94 run throughout the length of the liner, whereby the circulated water maintains the cylindrical casing at a reasonably low temperature. To further aid in cooling, the liner 92 contains a series of thin slots 100 machined into the internal wall of the liner. The slots 100 are uniformly spaced around the inner circumference of the liner 92. The slots are staggered longitudinally in an adjacently overlapping manner as shown in FIG. 7. This arrangement avoids continuous passageways in by-passing relation to the free-floating piston which would permit an excessive amount of water to enter the combustion chamber. Any water which is trapped in the slots 100 and enters the combustion chamber 38 as the free-floating piston descends will be vaporized to cool the liner 92 and to add volume to the combustion gases discharged to the gas engine.

Figure 6:
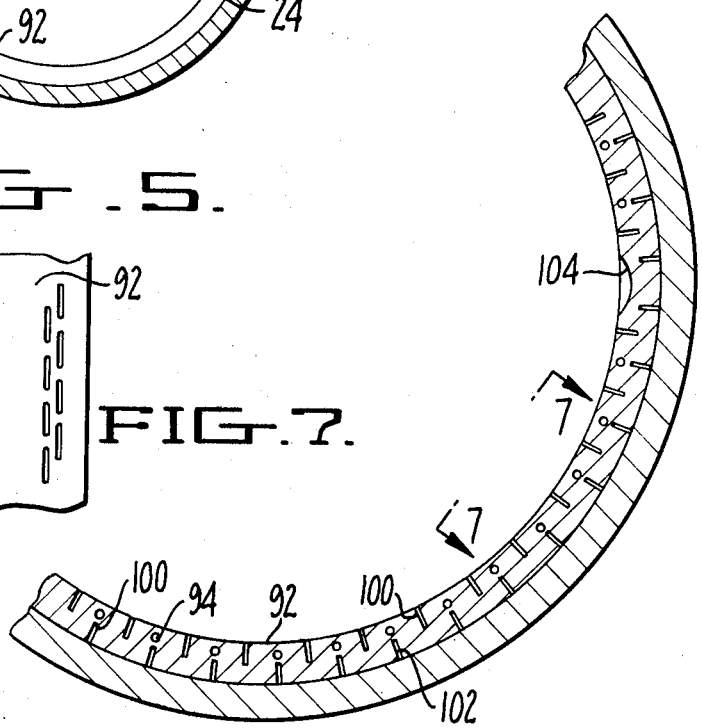
FIG. 6 is an enlarged partial view of the liner and outer casing shown in FIG. 5.

Additionally, slots 102 are machined in the outer surface of the liner 92. The slots 102 are slightly wider than the slots 100 on the internal wall of the liner 92, and continuously run the entire length of the liner 92 since no problem of water by-pass is present at the outer surface of the liner 92. The depth of the slots 102 extends slightly beyond the depth of the adjacent slots 100 on the inner surface as shown in FIG. 6. The primary purpose of the arrangement of slots 100 and 102 in the liner 92 is to provide a means for transmitting the internal pressures of the combustion pump units to the cylindrical casing 22 while preventing exposure of the cylindrical casing 22 to the mechanical stressing generated by changes in temperature during operation. The liner 92, which is exposed to products of combustion and to radiation effects, as the free-floating piston 24 descends during a power stroke, and to subsequent quench effects as the free-floating piston 24 rises on the scavenge part of the cycle, absorbs the mechanical stressing by its ability to compress without changes in the liner's inner or outer circumference.

Two piston guide tracks 104 are also machined at diametrically opposed positions on the internal wall of the liner 92, as shown in FIGS. 5 and 6. The guide tracks 104 run the length of the liner 92 and engage protruding arcuate guides 106 on the free-floating piston 24, as shown in the FIGS. 1, 2 and 5. The protruding arcuate guides 106 provide stabilizing extensions on the free-floating piston 24, preventing any occurrence of tilting or of rotation of the piston 24 as it descends during the power stroke and rises during the scavenging part of the cycle.

Returning to a detailed consideration of FIG. 2, the high pressures developed during combustion are transmitted to the top of the free-floating piston 24. The forces on the piston pressurize the water in the hydraulic chamber such that hydraulic pressures exceeding 1000 p.s.i. are achieved. Regulator valve 108 is closed to prevent the high pressure water from entering a small chamber 110 which is adapted to feed the second hydraulic turbine 16. The regulator valve 108 is spring-operated, and by adjustment of the compression of its spring 112 and hydraulic pressure required to close the valve may be controlled. Adjustment is accomplished by rotation of a hex-head 114 at the end of a valve stem 116. The valve stem 116, which is threaded through an end bracket 118 at the base of the pump unit, has a small circular plate 121 fixed to it and has a small circular plate 123 freely sliding on it, between which plates the spring 112 is compressed. The pressurized water in hydraulic chamber 36 is pumped through a conventional check valve 120 in a high pressure output line 122 to a specially designed discharge nozzle 124 shown in FIG. 8. The high pressure output line 122 for each of the three units is connected to a single discharge line 126 feeding the discharge nozzle 124. The velocity of the jet of water emitted from the discharge nozzle 124 is regulated to a relatively constant value by a needle valve 128, slidably mounted in the hollow nozzle portion of the discharge nozzle 124 and directed out a convergent jet orifice 130. Positioning of the needle valve 128 is responsive to the pressure in the discharge line 126.

A hydraulic regulator 132 for the needle valve 128 comprises a piston 134 connected to the distal end of the needle valve 128 contained in a cylinder 136. The piston 134 is actuated in one direction to remove the needle valve 128 away from the orifice 130 of the discharge nozzle 124 by the hydraulic pressure in the discharge line 126, which line is connected to the cylinder 136 by a small hydraulic line 138. The degree of actuation is controlled by a compression spring 140 which is maintained in position by the outer wall of the hydraulic regulator and the face of an adjustment screw 142 on a threaded portion of the needle valve 128. As the pressure in the discharge line 126 drops, the force of the compression spring overcomes the hydraulic force on the piston 134 to gradually close the needle valve 128. Although the flow of the emitted jet of water from the discharge nozzle 124 is reduced, the velocity is maintained relatively constant until a terminal pressure is reached at which point the needle valve 128 is fully closed and the discharge stopped. The terminal pressure can be controlled by selection of a suitable compression spring and by proper positioning of the adjustment screw 142 on the threaded portion 144 of the needle valve 128.

In the preferred embodiment herein disclosed, the first stage terminal pressure may be, for example, 1000 p.s.i. As this first stage output is supplied by the high pressure output of the three units delivered in sequential fashion, the emitted jet of water from the single high velocity discharge nozzle 124 will be continuous, varying only in the degree of flow discharge to the first hydraulic turbine in FIG. 1.

As the combustion gases expand when the free-floating piston 24 descends to pump water to the high pressure nozzle 124, the hydraulic pressure in the hydraulic chamber also reaches a first terminal pressure, here again selected at 1000 p.s.i. At 1000 p.s.i., the spring-loaded regulator valve 108, FIG. 2, opens to permit the water to be pumped to the small chamber 110 below the regulator valve 108 and then to lower pressure output line 146. As previously noted once the pressure for a particular unit drops below 1000 p.s.i., the high pressure discharge nozzle 124 either closes to prevent further flow from that particular unit or continues to remain open if sequentially it is being supplied by the next following unit. In the latter case, check valve 120 not only prevents backflow but also prevents further discharge from the particular unit in which the pressure has dropped below the first terminal pressure.

Figure 4:
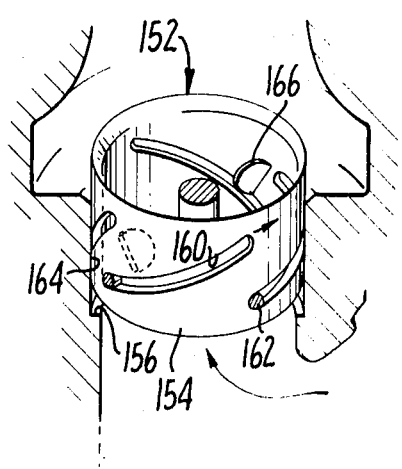
FIG. 4 is an enlarged partial section of the throat and flow valve shown in FIG. 2.
Figure 8:
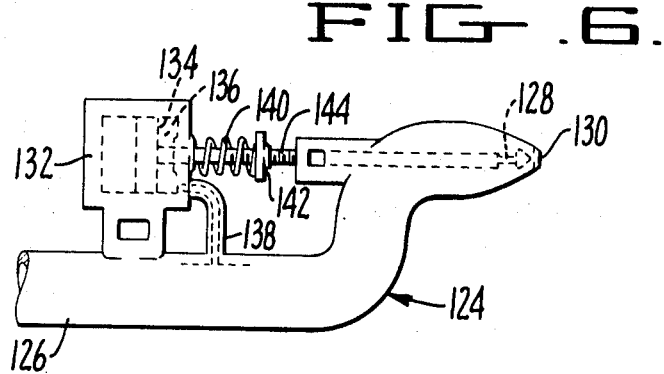
FIG. 8 is an enlarged view of the discharge nozzle shown in FIG. 1.

The lower pressure output line 146 for each of the three units is connected to a single lower pressure discharge line 148 feeding a lower pressure discharge nozzle 150, FIG. 1, which is substantially identical to the nozzle shown in FIG. 8. To obtain a second terminal pressure setting, which may be, for example, 200 p.s.i., the lower pressure discharge nozzle 150 need differ only in the use of a compression spring which will permit operation of the discharge nozzle in the 1000–200 p.s.i. range. Once a particular unit reaches the second terminal pressure of 200 p.s.i. the discharge nozzle will close unless it has begun to discharge water supplied from the next following unit in sequential operation. Once the next following unit commences its lower pressure pumping, the back flow to the preceding unit will hydraulically close a specially designed flow-operated valve 152 shown in FIGS. 2 and 4.

The flow-operated valve 152 comprises a cylindrical sleeve 154 seated on a shoulder formed in the end portion of the pump unit. This sleeve has four ascending helically arranged slots 160 such that the lower terminal portion of one slot commences at a point directly below the upper beginning portion of the adjacent slot. Two spring-loaded ball pins 162, which may be of the type commonly employed in socket wrenches, are mounted in the valve throat 164 so that they freely extend into two opposed slots 160 in the sleeve 154. Two opposed vanes 166 are disposed at an angle on the inner surface of the sleeve 154.

Backflow from the lower pressure output line exerts upward and lateral forces against the vanes 166 to cause the sleeve 154 to turn and ride up the ball pins 162 until the top of the sleeve 154 contacts the bottom of the poppet 168 of the regulator valve 108. In this position the ball pins 162 are located at the lower terminal portions of their respective slots 160. The flow-operated valve 152 in essence operates as a check valve. The sleeve remains in this closed position until the combustion process in the following cycle raises the hydraulic pressure in the hydraulic chamber 36 to a point exceeding 1000 p.s.i., whereupon the spring-loaded regulator valve 108 is forced down by action of the hydraulic pressure on the poppet 168 overcoming the oppositely directed force of spring 112. The downward movement of the regulator valve 108 also forces the flow-operated valve 152 down to its seating shoulder 156. The spring-loaded ball pins 162 are forced to retract until the sleeve is seated, at which point they extend into the upper beginning portions of their respective slots 160.

When the second terminal pressure is reached, a spring-loaded control valve 169, FIG. 2, opens to permit water to flow through control line 56 to the hydraulic actuator 48 to open exhaust valve 50. The combustion products which at their lowest pressure are at the second terminal pressure value expand into the exhaust line 41 and are emitted from a separate gas discharge nozzle 171 for each unit to a single gas turbine 20. Again, the sequentially integrated cycles of the three units provide a substantially continuous driving force to, in this instance, the gas turbine.

Just prior to the reaching of the second terminal pressure value in the hydraulic chamber, the downward moving free-floating piston 24 will be approaching the bottom of its stroke. To dissipate the momentum of the descending piston, an arresting device, as illustrated in FIG. 2 has been included. The bottom of the free-floating piston 26 carries a protuberance 170 which has integral therewith plunger 172. The plunger 172 fits closely but slidably within a centrally located bore 174 of an arresting boss 176 connected to the cylindrical casing by yoke member 178 which permits water to freely pass to the lower part 36a of the hydraulic chamber 36. Four tapered channels 180 are longitudinally machined in the plunger 172, as shown in FIGS. 2 and 5. When the piston 24 descends, the plunger 172 projects into the bore 174 forcing the trapper water therein upwardly through the tapered channels 180. The hydraulic pressure of the trapped water increases rapidly as the effective area of the channels 180 decreases to the discharge of water. The increasing hydraulic pressure opposes piston momentum to hydraulically snub the piston downstroke and bring the piston to a full stop without severe impact of the plunger 172 with the bottom 174a of the bore 174. A small drain opening 182 is drilled through the bottom 174a of the bore 174 to provide a flow of water at the end of each stroke and in this manner keep debris and sediment flowing out of the bore 174.

Sequential operation of the three pumping units is controlled by the timing device and fuel-air regulator shown in FIG. 9. Fuel from a reservoir 184 is pumped at high pressure by a hydraulic pump 186 located in a fuel supply line 188 for the three units. The fuel supply line 188 branches into individual feeder lines 190a, b, and c, for each of the units. Pressure-operated flow regulator valves 192a, b, and c, are included in each of the feeder lines 190 to control the amount of fuel supplied during each cycle of a unit. Air is supplied from an air cylinder 194 which is pumped to a high pressure by a compressor 196. An air supply line 198 branches into three feeder lines 200a, b and c, which are individually controlled by flow regulator valves 202a, b and c. The flow control valves 192 and 202 for fuel and air supply to the units are operated by pneumatic pressure from a control cylinder 204. Pressure in the control cylinder which regulates the degree of flow in each of the flow regulator valves 192 and 202 is regulated by a master control lever 206. The master control lever 206 is variably positionable by a detent rack 208, and, by rotation of a cam 210 asymmetrically pivoted on a pivot pin 212, will vary the compressive force of a spring 214. The spring 214 engages a pivot link 216 which swingably responds to the cam action of the master control lever 206. The opposite end of the spring 214 is connected to a pressure control valve 218. An offsetting force developed by a feedback pressure from bleeder line 222 running from control cylinder 204 to a control diaphragm 224 regulates the pressure control valve so that the desired pressure is maintained in the control cylinder 204 by a compressor 226.

Sequential timing is regulated by a rotating distributor cam 228 which is gear-driven by motor 232. Equidistantly positioned around the periphery of the distributor cam 228 are three piston-operated air valves 234a, b and c. Considering exemplar air valve 234c in detail, a pivotally mounted cam follower 236 is linked to the piston 238 in the air valve 234c. When the raised portion 240 of the distributor cam 228 engages the cam follower 236, which is held against the distributor cam 228 by a compression spring 242, the valve piston 238 is depressed to permit compressed air to flow from the control cylinder 204 to the pressure-operated flow regulator valves 192c and 202c and controls the supply of fuel and air, in this instance, to unit 3. The rate of air and fuel supplied to unit 3 is regulated by the selected pressure in the control cylinder 204 which is transmitted to the flow regulator valves 192 and 202c. Once the raised portion 240 of the distributor cam passes, injection of fuel and air to the combustion chamber of the particular unit ceases. Each of the other two piston-operated air valves, 234a and b, operates in an identical manner to actuate and regulate the flow regulation valves 192a and b, and 202c and b for units 1 and 2, respectively.

After a charge of fuel and air has been injected into the combustion chamber, during engagement of the raised portion 240 of the distributor cam 228 with the cam follower 236, the raised portion 240 of the cam 228 then engages and closes a set of spring-loaded ignition points 246 to ignite the injected charge. A high voltage potential is connected through the set of ignition points 246 to the electrodes 82, FIG. 2, by high voltage lead 84. As the distributor cam rotates, each unit is fueled and fired in timed sequence in like manner.

The sequential operation of the three unit pump system is shown in FIG. 10. First considering unit 1, remaining combustion gases are scavenged by the rising piston in the scavenge step. The charge is fired on closure of the set of ignition points by the distributor cam to raise the pressure of the water in the hydraulic chamber and pump water to the high pressure turbine in first stage output. The duration of high pressure pumping may be controlled by variation in the amount of injected fuel and air, or by variation in the velocity-flow relationship of water emitted from the high pressure discharge nozzle. As the free-floating piston descends in the cylinder casing, there is a resultant expansion of the gases. During this procedure, a first terminal pressure is reached, at which point pumping to the high pressure turbine ceases and pumping to the low pressure turbine commences in second stage output. Duration of second stage output may be also controlled by variation in the amount of initially injected fuel and air, or by variation in the velocity-flow relationship of water emitted from the low pressure discharge nozzle. As the water level decreases with an accompanying drop in pressure, a second terminal pressure is reached, at which point pumping to the low pressure turbine ceases and the exhaust valve is opened to deliver the combustion products to the gas turbine for third stage output. When the combustion products have been delivered for the most part to the gas turbine, the scavenging step is again initiated.

The steps for unit 2 are identical, with timed injection of fuel and air commencing immediately after the ignition step. Unit 3 follows in a similar manner, whereupon, on completion of the ignition step, unit 1 is again ready to commence fuel and air injection. The sequential operation of the three combined units delivers a substantially continuous output to each of the three turbines powering the generator.

What is claimed is:

1. A combustion pump for the high pressure pumping of liquids comprising a casing, a free piston slidably disposed therein, for reciprocal movement between an upper combustion chamber and a lower hydraulic chamber defined within said casing, a liquid input line connected to said casing and adapted to feed liquid into the hydraulic chamber and thereby raise a free piston toward the combustion chamber, a plurality of liquid output lines connected to the hydraulic chamber, means for introducing a fuel-air mixture into the combustion chamber and for igniting the same to drive said free piston downwardly within said casing and to forcibly displace liquid from the hydraulic chamber and means for directing liquid displaced from the chamber selectively through said output lines in accordance with the magnitude of hydraulic pressure of the fluid pressurized by said free piston.

2. A combustion pump system for the high pressure pumping of liquids comprising a plurality of casings, a free piston slidably disposed within each of said casings for reciprocal movement between an upper combustion chamber and a lower hydraulic chamber defined therein, a liquid input line connected to the hydraulic chamber of each casing, each free piston being adapted to be raised from its related hydraulic chamber toward its related combustion chamber by admission of liquid into said hydraulic chamber through the input line connected thereto, a plurality of liquid output lines connected to each hydraulic chamber, means for each casing to introduce a fuel-air mixture into the combustion chamber of the casing and for igniting the same therein to drive the free piston downwardly and forcibly discharge liquid therebeneath from the hydraulic chamber selectively through said output lines in accordance with the magnitude of hydraulic pressure of the fluid pressurized by the free piston, at least some of said liquid output lines being interconnected to form a first single liquid discharge line, and at least some of said liquid output lines being interconnected to form a second single output line, and control means adapted to sequentially integrate the reciprocal movement cycles of said free pistons to provide a substantially continuous liquid output from said discharge lines.

3. A combustion pump having a multi-stage discharge for selectively pumping therefrom liquids at predetermined pressure levels, said pump comprising a casing, a free piston slidably disposed therein for reciprocal movement between an upper combustion chamber and a lower hydraulic chamber defined by said casing, an input line adapted to feed liquid into said hydraulic chamber and thereby raise said free piston within said casing toward said combustion chamber, a plurality of liquid output lines connected to said hydraulic chamber for the selective discharge therefrom of liquid from said chamber, means for introducing a fuel-air mixture into said combustion chamber and for igniting the same therein to drive said free piston downwardly within said casing and forcibly discharge liquid from said hydraulic chamber first through one of said output lines and then through the other of said output lines, and means including valve means adapted to selectively direct the fluid being discharged to first one and then the other of said output lines in accordance with the magnitude of hydraulic pressure of the fluid pressurized by said free piston.

4. A combustion pump system having a multistage discharge for the pumping of liquids therefrom in accordance with predetermined levels of pressure applying to such liquids, said system comprising a plurality of casings having interconnected liquid output lines at each of the plurality of liquid discharge stations, the interconnected output lines for each like discharge station forming a single liquid discharge line for such group of stations, each of said casings having a free piston slidably disposed therein for reciprocal movement between an upper combustion chamber and a lower hydraulic chamber defined by said casing, a liquid input line connected to each hydraulic chamber to admit liquid into said chamber and thereby raise the free piston therein towards its associated combustion chamber, a plurality of output lines connected to each hydraulic chamber for the selective discharge therethrough of liquid from the hydraulic chamber, means for introducing a fuel-air mixture into each combustion chamber and for igniting the same therein to drive the piston downwardly and discharge liquid from the hydraulic chamber, means including valve means for the selective discharge of said liquids to first one of said output lines and then the other of said output lines, responsive to the hydraulic pressure condition of said liquid, and control means for sequentially integrating the reciprocal movement cycles of said pistons to provide a substantially continuous liquid output to each discharge line for each group of discharge stations.

5. A combustion pump for the high pressure pumping of liquids comprising a high pressure cylindrical casing, a free piston slidably disposed therein, a hydraulic chamber defined within said casing by the bottom of the free piston, the side of the cylindrical casing, and a hemispherical lower portion of the casing, an input line connected to said hydraulic chamber to admit liquid to said chamber under pressure sufficient to hydraulically move the free piston upwardly within said casing, a combustion chamber defined within said casing by the top of the free piston, the side of the cylindrical casing and a hemispherical upper portion of the casing, a plurality of liquid output lines connected to said hydraulic chamber, means to introduce a compressed mixture of fuel and air into said combustion chamber and to ignite the same therein, whereby a liquid is pumped at high pressure out of said hydraulic chamber by the action of the forced descent of said free piston within said casing and means for directing fluid displaced from the chamber selectively through said output lines in accordance with the magnitude of hydraulic pressure of the fluid pressurized by said free piston.

6. The apparatus of claim 5 in combination with at least one additional combustion pump corresponding to said combustion pump, wherein at least some of the output lines of said pumps are interconnected to form a first single discharge line, and at least some of the output lines are interconnected to form a second discharge line, and wherein there is provided control means to regulate the operation of the pumps to provide sequential integration of the reciprocal movement of said free piston and thereby provide a substantially continuous discharge of pressurized liquid from said discharge lines.

References Cited
UNITED STATES PATENTS

| 1,219,867 | 3/1917 | Reilly | 103—249 |
| 2,872,778 | 2/1959 | Dane | 103—54X |

ROBERT M. WALKER, Primary Examiner